(12) United States Patent
Suzuki

(10) Patent No.: US 9,672,454 B2
(45) Date of Patent: Jun. 6, 2017

(54) IMAGE PROCESSING APPARATUS FOR RENDERING PLURALITY OF OBJECTS BY DIVIDING PLURALITY OF OBJECTS INTO PLURALITY OF GROUPS, AND IMAGE PROCESSING METHOD

(71) Applicant: CANON KABUSHIKI KAISHA, Tokyo (JP)

(72) Inventor: Tatsunori Suzuki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/132,925

(22) Filed: Apr. 19, 2016

(65) Prior Publication Data

US 2016/0314383 A1 Oct. 27, 2016

(30) Foreign Application Priority Data

Apr. 22, 2015 (JP) ................................. 2015-087726

(51) Int. Cl.
G06K 15/02 (2006.01)

(52) U.S. Cl.
CPC ..... G06K 15/1851 (2013.01); G06K 15/1809 (2013.01); G06K 15/1813 (2013.01); G06K 15/1836 (2013.01); H04N 2201/0094 (2013.01)

(58) Field of Classification Search
CPC ........... G06K 15/1851; G06K 15/1855; G06K 15/1836

USPC ........ 358/1.2, 1.6, 2.1, 3.24, 1.18, 538, 540; 345/620, 624, 629, 422

See application file for complete search history.

(56) References Cited

U.S. PATENT DOCUMENTS

| 2010/0083094 | A1* | 4/2010 | Kerr | ......................... G06T 11/40 715/234 |
| 2010/0091310 | A1* | 4/2010 | Thomas | ................... G06T 11/60 358/1.9 |

FOREIGN PATENT DOCUMENTS

JP 2014-002591 A 1/2014

* cited by examiner

*Primary Examiner* — Jamares Q Washington
(74) *Attorney, Agent, or Firm* — Canon USA, Inc. I.P. Division

(57) ABSTRACT

An image processing apparatus for rendering objects group by group, which divides a plurality of objects in an application range of an original clip command into a first group and a second group, wherein the image processing apparatus applies, in the rendering of the first group, a clip process based on a first clip command corresponding to the original clip command to a part of the plurality of objects divided into the first group, and applies, in the rendering of the second group, a clip process based on a second clip command corresponding to the original clip command to a rest part of the plurality of objects divided into the second group.

8 Claims, 9 Drawing Sheets

IMAGE PROCESSING APPARATUS FOR RENDERING PLURALITY OF OBJECTS BY DIVIDING PLURALITY OF OBJECTS INTO PLURALITY OF GROUPS, AND IMAGE PROCESSING METHOD

BACKGROUND OF THE INVENTION

Field of the Invention

The present invention relates to an image processing apparatus for rendering a plurality of objects by dividing the plurality of objects into a plurality of groups, and an image processing method.

Description of the Related Art

As a conventional rendering process, there is a speed-up technique for classifying objects included in image data into groups and performing a rendering process on each group. For example, Japanese Patent Application Laid-Open No. 2014-2591 discusses a technique for, if image data includes a large number of objects to be rendered and therefore is complex, performing a layer division rendering process for classifying a plurality of objects into a plurality of groups and performing a rendering process on a layer of each group. In the layer division rendering process, the rendering process is performed on each layer, whereby it is possible to reduce cache misses in a central processing unit (CPU) caused by the rendering process and reduce the processing time.

Objects used in a rendering process may be related to (have a dependent relationship with) each other. As an example, in a case where objects are subjected to a clip process, which is a clipping process by logical operations, these objects can be said to be related to (have a dependent relationship with) each other. Additionally, for example, also in a case where objects are subjected to a raster operation (ROP) process, these objects can be said to have a dependent relationship with each other. If the objects thus having a dependent relationship with each other are divided into different layers in the above layer division rendering process, processing cannot be completed in each layer, and an image of an erroneous rendering result may be output.

SUMMARY OF THE INVENTION

The present invention is directed to enabling processing to be completed in each of a plurality of classified groups (layers).

According to an aspect of the present invention, an image processing apparatus for rendering objects, the image processing apparatus includes a division unit configured to divide, according to order of closeness of the objects to a background surface, the objects so that each of the objects is included in any one of a plurality of groups including at least a first group and a second group, the objects included in the first group being closer to the background surface than the objects included in the second group, and a rendering unit configured to render the objects included in the first group to obtain a rendering result, and render the objects included in the second group using the rendering result in a manner such that the objects in the second group is superimposed on the rendering result, wherein, in a case where the division unit divides, in the dividing, a plurality of objects included in an application range of a clip command into the first group and the second group, the rendering unit applies, in the rendering of the first group, a clip process based on a first clip command corresponding to the clip command to a part of the plurality of objects divided into the first group, and applies, in the rendering of the second group, a clip process based on a second clip command corresponding to the clip command to a rest part of the plurality of objects divided into the second group.

Further features of the present invention will become apparent from the following description of exemplary embodiments with reference to the attached drawings.

DESCRIPTION OF THE EMBODIMENTS

<System Configuration>

Figure 1:
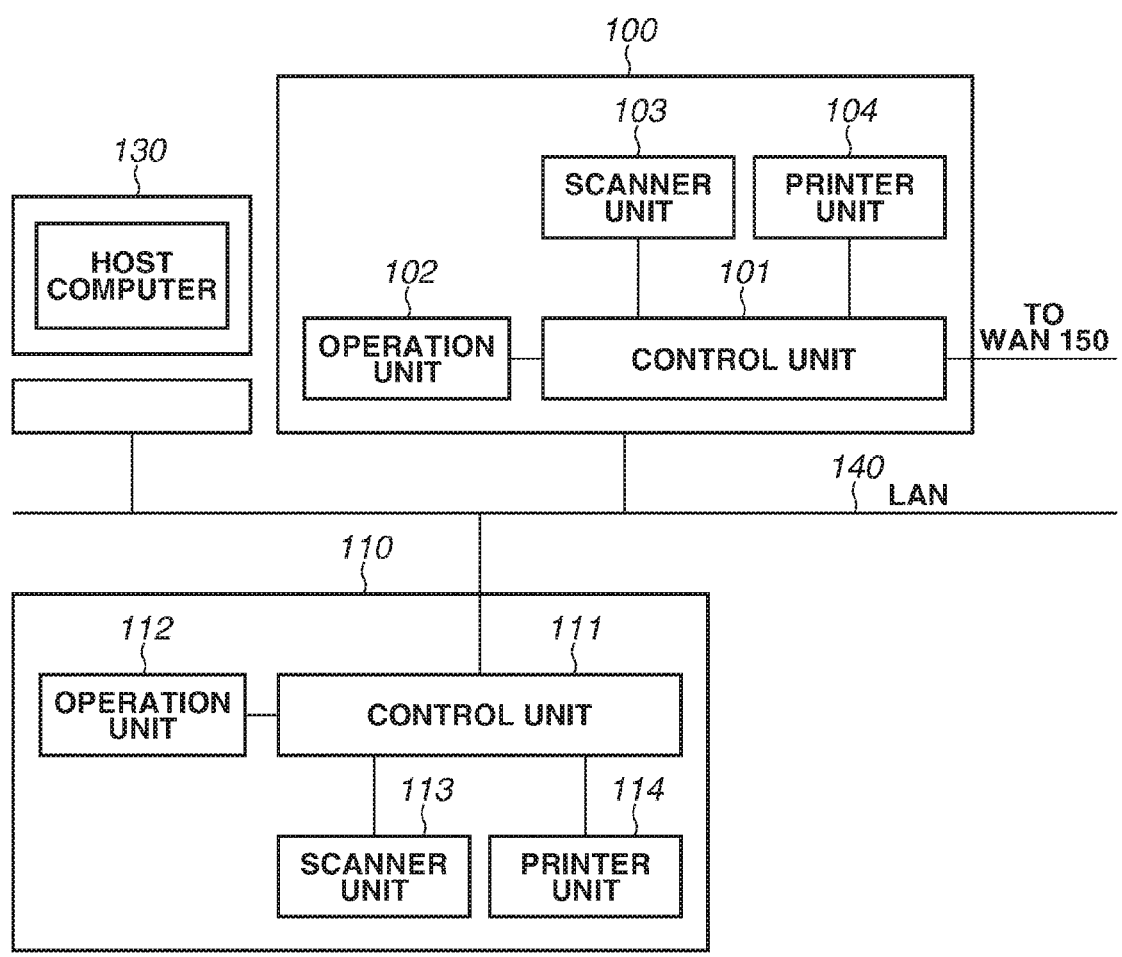
FIG. 1 is a diagram illustrating an example of a general configuration of an image processing system according to the present exemplary embodiment.

FIG. 1 is a diagram illustrating an examples of a system configuration of an image processing system and a hardware configurations of image processing apparatuses included in the image processing system, according to a first exemplary embodiment. In the image processing system illustrated in FIG. 1, a host computer (information processing apparatus) 130 and two image processing apparatuses 100 and 110 are connected to each other via a local area network (LAN) 140. Each of the image processing apparatuses 100 and 110 according to the present exemplary embodiment is a multi-function peripheral (MFP), which is also an image forming apparatus. Each of the image processing apparatuses 100 and 110, however, is not limited to an MFP, and may be a single-function printer (SFP), or may be a laser beam printer or an inkjet printer. Further, the number of the image processing apparatuses 100 and 110 connected to the LAN 140 does not limit the present exemplary embodiment.

Further, in the present exemplary embodiment, the host computer 130 and the image processing apparatuses 100 and 110 are connected to the LAN 140. The present exemplary embodiment, however, is not limited to this. Alternatively, for example, the host computer 130 and the image processing apparatuses 100 and 110 may be connected to any network, such as a wide area network (WAN) 150, which is typified by a public line. Further, these apparatuses may be connected by a serial transmission method, such as Universal Serial Bus (USB), or by a parallel transmission method, such as Centronics or Small Computer System Interface (SCSI).

The host computer 130 has the function of a personal computer. The host computer 130 can transmit and receive a file, and can transmit and receive electronic mail, using the File Transfer Protocol (FTP) or the Server Message Block (SMB) protocol via the LAN 140 or the WAN 150. Further, in the host computer 130, a CPU of the host computer 130 executes a printer driver program stored in a storage unit of the host computer 130. This enables the host computer 130 to instruct the image processing apparatuses 100 and 110 to perform printing.

Each of the image processing apparatuses 100 and 110 according to the present exemplary embodiment is an image forming apparatus having a printer function and a scanner function. The image processing apparatus 100 includes a control unit 101, an operation unit 102, a scanner unit 103, and a printer unit 104 and is connected to the LAN 140 and the WAN 150. The image processing apparatus 110 includes a control unit 111, an operation unit 112, a scanner unit 113, and a printer unit 114 and is connected to the LAN 140 and the WAN 150. The internal configurations of the image processing apparatuses 100 and 110 are similar to each other, and therefore, for ease of description, the image processing apparatus 100 is described below, thereby omitting the description of the image processing apparatus 110.

The control unit 101 is a controller unit. The control unit 101 connects to components and controls the operations of the components, thereby governing the control of the operation of the entirety of the image processing apparatus 100. Further, the control unit 101 transmits and receives image data to and from the host computer 130 or an apparatus (not illustrated) via the LAN 140 or the WAN 150. The operation unit 102 is a user interface (UI) that includes an input button and a display having a touch panel and receives an input of, for example, information of print settings from a user. Further, based on an instruction from the control unit 101, the operation unit 102 displays an image on the display having the touch panel. Information of print settings input by a user instruction is transmitted from the operation unit 102 to the control unit 101. The scanner unit 103 is an image input device for reading a document and inputting the read image to the control unit 101. The printer unit 104 is an image output device for receiving image data (bitmap data) processed by the control unit 101 and executing a printing process based on the image data.

<Configuration of Image Processing Apparatus>

Figure 2:
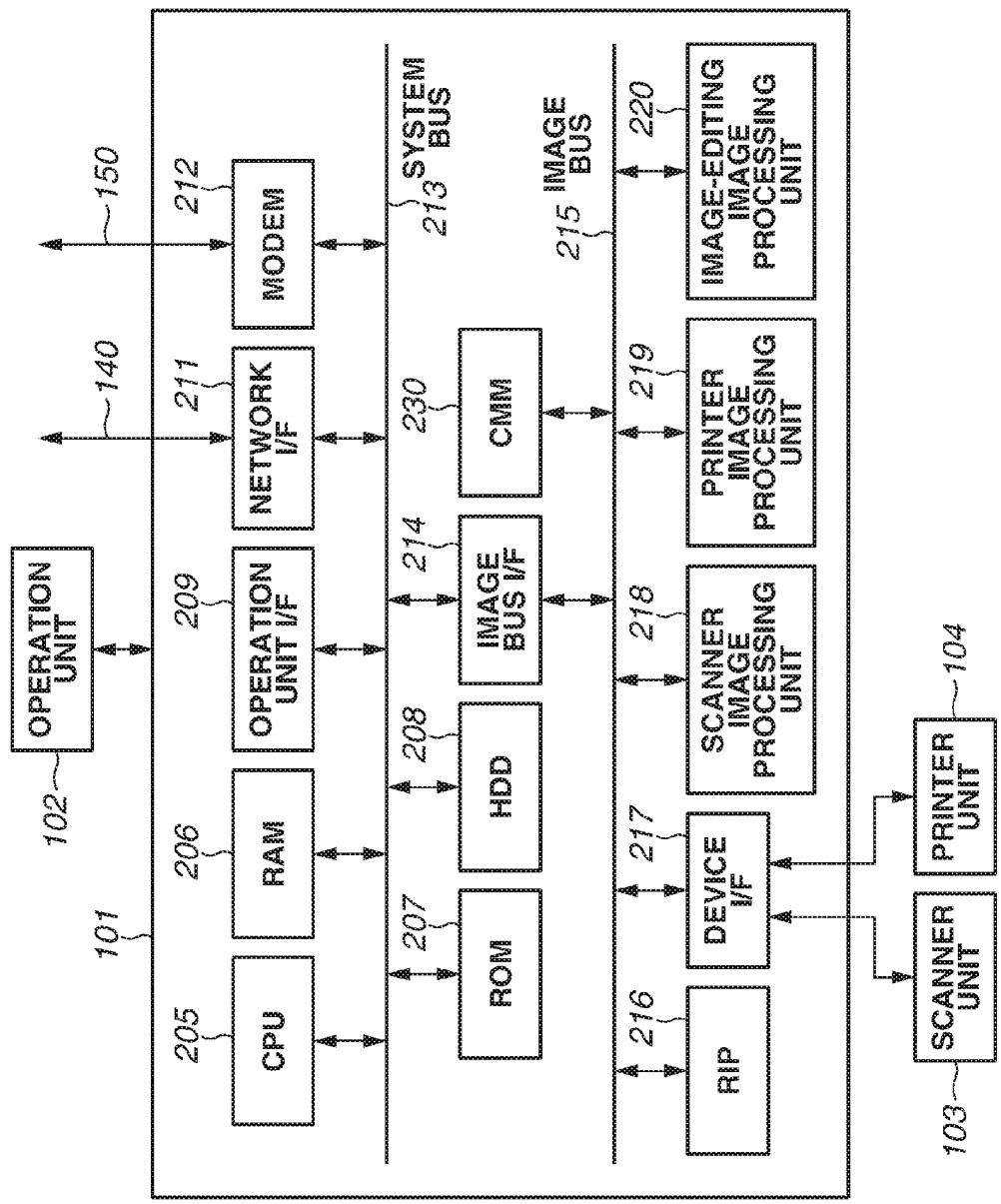
FIG. 2 is a diagram illustrating an example of a general configuration of an image processing apparatus according to the present exemplary embodiment.

FIG. 2 is a diagram illustrating an example of the detailed internal configuration of the image processing apparatus 100 according to the present exemplary embodiment. A CPU 205 is a central processing unit for controlling the entirety of the image processing apparatus 100. The CPU 205 may include a plurality of CPUs. A random-access memory (RAM) 206 is a work memory for the operation of the CPU 205 and is also an image memory for temporarily storing input image data. The RAM 206 is also referred to as a "main memory", and the term "main memory" as used below refers to the RAM 206. A read-only memory (ROM) 207 is a boot ROM and stores a boot program for the system. A hard disk drive (HDD) 208 stores system software programs for various processes and input image data and the like. In the image processing apparatus 100 according to the present exemplary embodiment, thresholds and other various setting values used by the CPU 205 in processes described below are stored in the ROM 207 or the HDD 208.

An operation unit interface (I/F) 209 is an interface unit for connecting the operation unit 102 and the control unit (controller unit) 101 to each other. When image data for displaying an image of an operation screen on the display of the operation unit 102 is supplied from the control unit 101, the operation unit I/F 209 outputs the image data to the operation unit 102. Further, the operation unit I/F 209 has the function of transmitting, to the CPU 205, information of, for example, print settings input by the user through the operation unit 102. A network I/F 211 is achieved by, for example, a LAN card. The network I/F 211 connects to the LAN 140, and inputs and outputs information from and to an external apparatus. A modem 212 connects to the WAN 150, and inputs and outputs information from and to an external apparatus. The above units are arranged so as to be connected to a system bus 213.

An image bus I/F 214 is an interface unit for connecting the system bus 213 and an image bus 215, which transfers image data at high speed, to each other and is a bus bridge for converting a data structure. The image bus 215 is connected to a raster image processor (RIP) 216, a device I/F 217, a scanner image processing unit 218, a printer image processing unit 219, an image-editing image processing unit 220, and a color management module (CMM) 230. The RIP 216 rasterizes a page description language (PDL) code (PDL data) or vector data into bitmap data.

The device I/F 217 connects the scanner unit 103 and the printer unit 104 to the control unit 101 and performs the synchronous-to-asynchronous or asynchronous-to-synchronous conversion of image data. The scanner image processing unit 218 performs various processes, such as correction, processing, and editing, on image data input from the scanner unit 103. The printer image processing unit 219 performs processes, such as correction and resolution conversion according to a printer engine of the printer unit 104, on image data to be printed by the printer unit 104. The image-editing image processing unit 220 performs various types of image processing, such as the rotation of image data and a compression/decompression process on image data.

The CMM 230 is a dedicated hardware module for performing on image data a color conversion process (also referred to as a "color space conversion process") based on a color profile and calibration data. The color profile is information, such as a function for converting color image data represented as a color space dependent on a device into a color space (e.g., Lab) independent of a device. The calibration data is data for correcting the color reproduction characteristics of the scanner unit 103 and the printer unit 104 of the image processing apparatus 100.

The CPU 205 executes processing based on programs stored in the ROM 207 or the HDD 208, thereby achieving software modules of the image processing apparatus described below and the processing of flowcharts described below.

Terms in the present exemplary embodiment are described below. A "scan line" is a line in a main scanning direction in which image data is successively subjected to a memory scan in an image forming process, and the height of a scan line is 1 pixel. Further, in the present exemplary embodiment, a group of a plurality of scan lines is referred to as a "band". A closed region surrounded by edges in a single scan line is referred to as a "span". A "fill" is filling information regarding a span. There are a fill having a different color value in each pixel, such as bitmap data or shading, and a fill in which the color value does not change in a span, such as solid fill. An "edge" refers to the boundary between objects to be rendered in a page, or the boundary between an object and a background. That is, an edge is the outline of an image object.

A "level" indicates a higher/lower relationship between objects to be rendered in a page, and a different level number is invariably assigned to each object. The smaller the level number of an object, the closer the object is to a background surface. In the present exemplary embodiment, each level number is assigned according to the type of the object. Further, in the present exemplary embodiment, "the type of the object" corresponds to the type of a display list (DL)

command in PDL data. Examples of the type of the object include types corresponding to a clipper command and a polygon rendering command.

A "group" includes a plurality of levels grouped in ascending order. For example, if there are level numbers "1 to 3001", and 1000 levels are included in a single group, the levels are grouped into the level numbers "1 to 1000", "1001 to 2000", "2001 to 3000", and "3001". A "layer" is a single group formed by grouping a plurality of levels in ascending order, and higher/lower relationships are set between the layers. For example, a layer on the lowermost background surface (the lowermost surface) is a group having the level numbers "1 to 1000", a layer on the next upper surface is a group having the level numbers "1001 to 2000", and a layer on the next upper surface is a group having the level numbers "2001 to 3000". Then, a layer on the uppermost surface is a group having the level number "3001".

<Image Forming Process>

Figure 3:
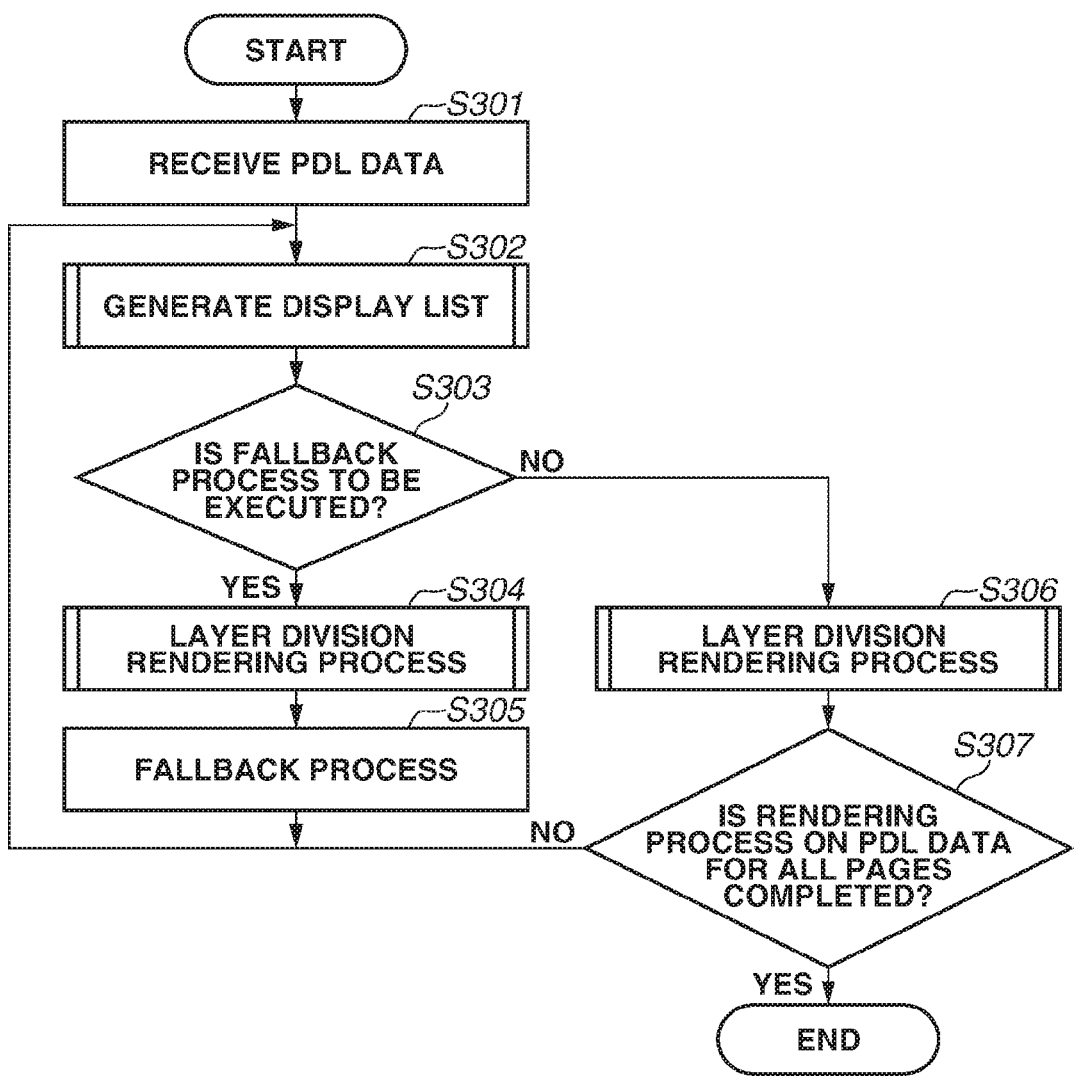
FIG. 3 is a flowchart of a rendering process.

Next, with reference to FIG. 3, a description is given of the basic flow of an image forming process executed by the image processing apparatus 100 according to the present exemplary embodiment. A processing flow illustrated in FIG. 3 is executed by the control unit 101. More specifically, the processing flow is achieved by the CPU 205 of the control unit 101 loading a system software program stored in the HDD 208 into the RAM 206 and executing the system software program.

In a flowchart in FIG. 3, in step S301, the CPU 205 receives PDL data. In the present exemplary embodiment, it is assumed that the PDL data is image data including a plurality of objects. After step S301, the processing proceeds to step S302.

In step S302, the CPU 205 generates a display list from the PDL data received in step S301 and stores the display list in a display list storage area on the main memory (hereinafter referred to as a "DL memory"). In this process, to generate a display list for a single page, the CPU 205 interprets PDL data for a single page from its beginning and sequentially generates a display list according to an interpreted rendering command. Further, when generating the display list, the CPU 205 sequentially monitors the total size of the display list stored in the DL memory and determines whether the total size exceeds a predetermined threshold (hereinafter referred to as a "DL total size threshold"). In a case where the CPU 205 determines that the total size of the display list exceeds the DL total size threshold, the CPU 205 determines that a fallback process is to be executed. Then, the CPU 205 temporarily stops the generation of the display list and sets a fallback determination flag to on. In a case where, on the other hand, the CPU 205 determines that the total size of the display list is less than or equal to the DL total size threshold, the CPU 205 determines that the fallback process is not to be executed. Then, the CPU 205 generates the display list for a single page and sets the fallback determination flag to off. After step S302, the processing proceeds to step S303. The details of the display list generation process in the present exemplary embodiment will be described below in <Regarding Display List Generation Process Method>. Further, the details of the fallback process will be described below in <Fallback Process>.

In step S303, according to the fallback determination flag (on or off), the CPU 205 determines whether the fallback process is to be executed. In a case where the CPU 205 determines in step S303 that the fallback determination flag is on, the processing proceeds to step S304. In a case where, on the other hand, the CPU 205 determines in step S303 that the fallback determination flag is off, the processing proceeds to step S306.

In step S304, the CPU 205 performs a layer division rendering process on the display list stored in the DL memory, thereby generating a bitmap. The details of the layer division rendering process will be described below.

In step S305, the CPU 205 executes the fallback process. In step S305, the CPU 205 performs a page superimposition process for superimposing the bitmap generated in the layer division rendering process on a background image. Then, the CPU 205 compresses a bitmap obtained by the superimposition, thereby reducing the data size. Further, the CPU 205 stores the compressed bitmap as a display list of a background image in the DL memory. In the first fallback process, there is no background image, and therefore, the result of the superimposition process is the bitmap generated in step S304. After step S305, the processing returns to step S302.

In step S306, the CPU 205 performs the layer division rendering process on the display list stored in the DL memory, thereby generating a bitmap. After step S306, the processing proceeds to step S307.

In step S307, the CPU 205 determines whether the rendering process on the input PDL data for all the pages is completed. In a case where the CPU 205 determines that the rendering process is not completed, then in order that the rendering process is performed on the next page, the processing proceeds to step S302. In a case where, on the other hand, the CPU 205 determines that the rendering process is completed, the processing of the flowchart in FIG. 3 ends. In the processing of the subsequent stage of the flowchart in FIG. 3, the bitmap images obtained by rendering are subjected to image processing, transmitted to the printer unit 104, and printed by the printer unit 104.

<Fallback Process>

Next, the fallback process is described. For example, when a display list is generated from a page description language (PDL data), and if the size of input PDL data is too large, the capacity of the DL memory for storing all the display lists may be insufficient. Thus, in the present exemplary embodiment, the fallback process is performed to prevent insufficiency of the capacity of the DL memory.

In the fallback process, first, the CPU 205 generates a display list having a size capable of being stored in the DL memory from PDL data corresponding to a part of a plurality of objects and executes a rendering process on the display list, thereby generating a bitmap. Then, the CPU 205 deletes from the DL memory the display list used to generate the bitmap. Further, the CPU 205 performs irreversible compression, such as Joint Photographic Experts Group (JPEG) compression, on the generated bitmap to reduce the data size, and stores the compressed bitmap as a display list of a background image in the DL memory again. Then, in the free space in the DL memory generated by the compression of the bitmap, the CPU 205 stores a display list generated from the rest of the PDL data.

Next, the CPU 205 superimposes, on the bitmap as the already rendered background image stored in the DL memory, a bitmap obtained by rendering the display list newly generated from the PDL data. The CPU 205 performs this superimposition process on bitmaps, thereby generating a bitmap to be ultimately sent to the printer unit 104.

The above process is the fallback process. The determination of whether the fallback process is to be performed is depending on whether the control unit 101 determines that the total amount of the display list stored in the DL memory exceeds the predetermined threshold (the DL total size threshold). That is, in the case of the present exemplary embodiment, when a display list is generated from PDL data, and if the total size of the display list stored in the DL memory exceeds the DL total size threshold, the fallback process is executed.

The background image used in the superimposition process on the bitmaps in the fallback process in step S305 in FIG. 3 is a bitmap having a size of a single page already generated by the rendering process. This background image has been compressed, and the display list of the background image is stored in the DL memory. In a case where a background image is present in the rendering process, the CPU 205 decompresses this compressed background image and performs the process of superimposing the background image when performing rendering on a processing target display list. That is, in the fallback process, image data obtained by decompressing compressed image data is used for superimposition.

<Software Modules by Program>

Figure 4:
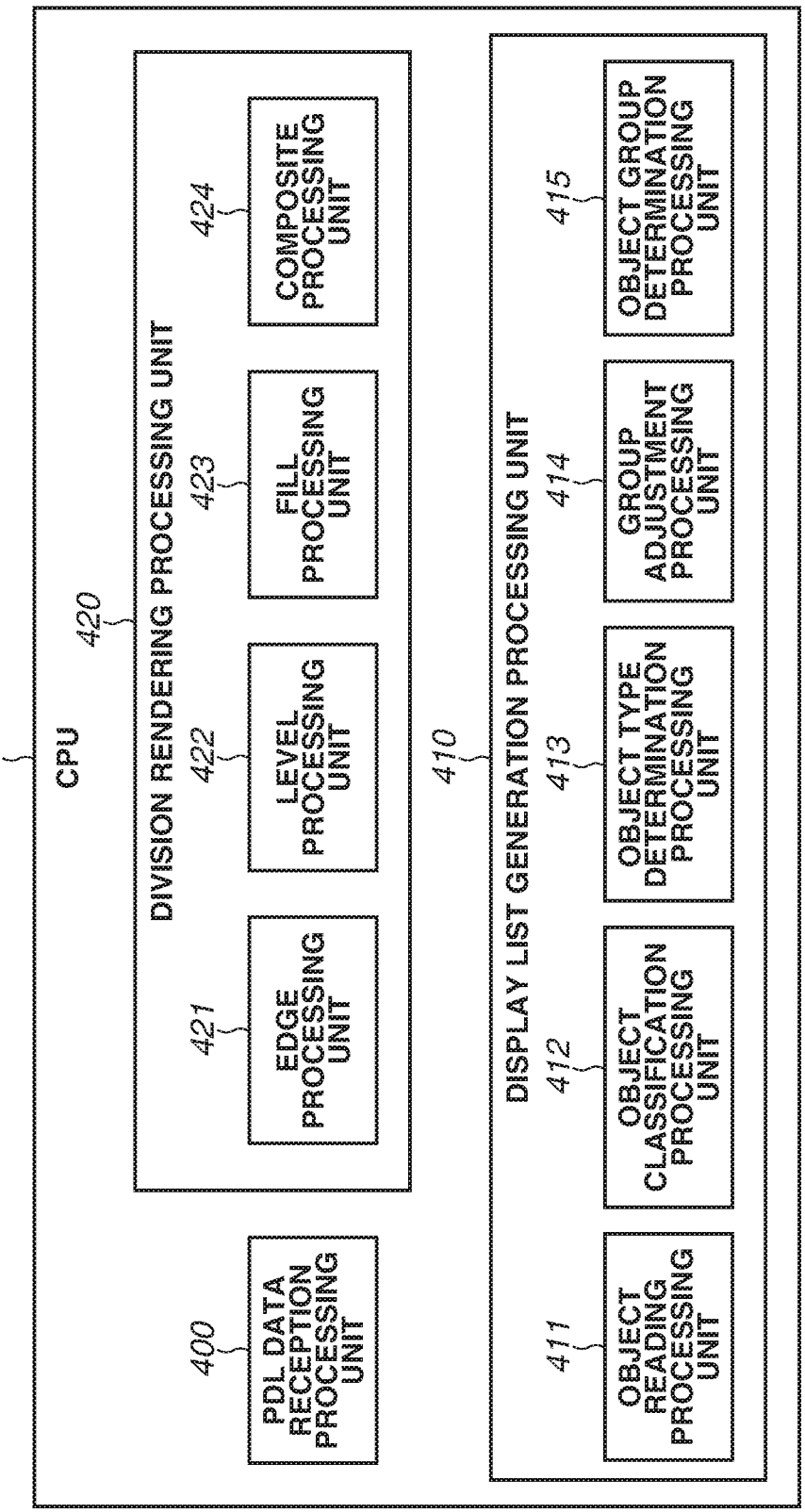
FIG. 4 is a diagram illustrating an example of configuration of modules achieved by executing software programs.

FIG. 4 is a diagram illustrating examples of software modules (hereinafter referred to as "modules") formed by the control unit 101 of the image processing apparatus according to the present exemplary embodiment executing a software program. More specifically, the software modules are modules formed by the CPU 205 of the control unit 101 loading a system software program stored in the HDD 208 into the RAM 206 and executing the system software program.

In FIG. 4, a PDL data reception processing unit 400 is a module for receiving PDL data in step S301 in FIG. 3.

A display list generation processing unit 410 is a module for generating a display list from the PDL data in step S302 in FIG. 3. The display list generation processing unit 410 stores the generated display list in the display list storage area on the main memory (the DL memory). The display list generation processing unit 410 includes five modules, namely an object reading processing unit 411, an object classification processing unit 412, an object type determination processing unit 413, a group adjustment processing unit 414, and an object group determination processing unit 415.

The object reading processing unit 411 is a module for performing the process of sequentially reading a plurality of objects from PDL data. The object classification processing unit 412 is a module for performing the process of classifying a plurality of objects read by the object reading processing unit 411 into a plurality of groups. The details of the process of classifying a plurality of objects into a plurality of groups will be described below.

The object type determination processing unit 413 is a module for performing the process of determining the types of objects read by the object reading processing unit 411. Further, the object type determination processing unit 413 determines whether objects classified into a plurality of groups by the object classification processing unit 412 include objects related to each other. In the present exemplary embodiment, as an example of the objects related to each other, objects related to a clip process for clipping an image by logical operations are described. The objects related to the clip process have a mutually dependent relationship. Thus, in the following description, these objects are referred to as "objects having a dependent relationship with each other". This clip process is the following process. In a case where the clip process is applied to an object, a part of the object is rendered, but a rest part of the object is not rendered. In other words, in a case where the clip process is applied to an object, a rest part of the object other than a part of the object is hidden.

The object group determination processing unit 415 is a module for performing the process of determining whether objects having a dependent relationship with each other according to the determination of the object type determination processing unit 413 are classified into different groups. More specifically, in a case where the types of objects having a dependent relationship with each other are objects related to the clip process, which will be described below, the object group determination processing unit 415 determines whether these objects are classified into different groups.

The group adjustment processing unit 414 is a module for performing the process of, according to the types of objects determined by the object type determination processing unit 413, adjusting groups to which these objects belong. More specifically, in a case where the object group determination processing unit 415 determines that objects having a dependent relationship with each other are classified into different groups, the group adjustment processing unit 414 adjusts the groups to which the objects having the dependent relationship belong. Particularly, in a case where the object group determination processing unit 415 determines that objects related to the clip process are classified into different groups, the group adjustment processing unit 414 adjusts the groups by a clip command correction process and a clip command addition process. The clip command correction process is the process of, in a case where objects related to the clip process are classified into different groups, correcting a clip command so that the objects related to the clip process are subjected to the clip process. The clip command addition process is the process of adding a clip command corrected in the clip command correction process to all the groups to which the objects related to the clip process belong.

A division rendering processing unit 420 is a module for performing the layer division rendering process on the display list stored in the DL memory, thereby generating a bitmap in step S304 in FIG. 3. The division rendering processing unit 420 includes four modules, namely an edge processing unit 421, a level processing unit 422, a fill processing unit 423, and a composite processing unit 424.

The edge processing unit 421 is a module for performing edge processing. The edge processing includes five main processes, namely an edge loading process, an edge deletion process, an X-coordinate calculation process, an edge sorting process, and an edge tracking process. The edge loading process is the process of loading edge data indicating the outline of an object from the display list stored in the DL memory into the main memory. The X-coordinate calculation process is the process of, based on the inclination of an edge and a fill-rule with respect to each scan line, calculating X-coordinates indicating the position of the edge in loaded edge data. The edge sorting process is the process of, with reference to a link list (an edge list) termed an active edge list (AEL), sorting edges appearing in scan lines that are being processed, in ascending order of the X-coordinates of the edges from the beginning of the edge list with respect to each scan line. The edge sorting process is the process of, in a case where scan lines are switched and the X-coordinates of an edge are turned back to front, or in a case where an edge newly appears or disappears, updating the link structure of the edge list. The edge tracking process is the process of transferring the edge list with which the sorting of edges is finished, to the level processing unit 422 as edge data and level data in ascending order of X-coordinates. The edge deletion process is the process of deleting an edge of which the rendering is finished last.

The level processing unit 422 is a module for performing level processing. The level processing includes three main processes, namely a level addition process, a level deletion process, and a level sorting process. The level addition process is the process of, based on the direction of an edge included in edge data sent from the edge processing unit 421 and clip information, determining whether the edge is an edge as a rendering target. In a case where the edge is a rendering target, the level processing unit 422 adds corresponding edge data to a link list termed an active level list (ALL). The level deletion process is a process opposite to the level addition process and is the process of, in a case where an edge having been a rendering target is not currently a rendering target based on the direction of the edge and clip information, deleting the corresponding edge data from the ALL. The level sorting process is the process of invariably sorting the ALL in ascending order of level number. In a case where a level is added or deleted, this sorting process is performed. Level data subjected to these processes is transferred to the fill processing unit 423 with respect to each span.

The fill processing unit 423 is a module for performing fill processing. The fill processing includes three main processes, namely an image enlargement/reduction process, an image rotation process, and a pixel generation process. The image enlargement/reduction process is the process of, in a case where an enlargement ratio is specified for a bitmap image included in a display list, generating a fill according to the specifying. The image rotation process is the process of, in a case where rotation information is specified for a bitmap image included in a display list, generating a fill according to the specifying. The pixel generation process is the process of, in a case where a certain color value and change information of the color value are specified in a display list, generating a fill according to the specifying.

The composite processing unit 424 is a module for performing composite processing. The composite processing is the process of, based on the higher/lower relationship between levels determined by the level processing unit 422 and a pixel generated by the fill processing unit 423, performing superimposition specified for a display list.

The above types of processing of the edge processing unit 421, the level processing unit 422, the fill processing unit 423, and the composite processing unit 424 of the division rendering processing unit 420 are performed in parallel using a pipeline with respect to each span. A span in each scan line is subjected to a pipeline process in the order of the edge processing, the level processing, the fill processing, and the composite processing.

<Regarding Display List Generation Process Method>

Next, the display list generation process method in step S302 in FIG. 3 is described. In step S302, the CPU 205 generates a display list that can be executed in the layer division rendering process in step S304 and S306. A case is described where the CPU 205 generates a display list for dividing layers, for example, every 1000 levels in the layer division rendering process in step S304 and S306. Further, in the following description, a case is described where a DL command in the PDL data includes a clip process for clipping a predetermined region.

In the present exemplary embodiment, in the layer division rendering process in step S304 and S306, the CPU 205 generates a bitmap page image such that objects having the level numbers "1 to 1000" are included in a first layer. Next, the CPU 205 generates a bitmap page image such that objects having the level numbers "1001 to 2000" are included in a second layer.

Figure 5:
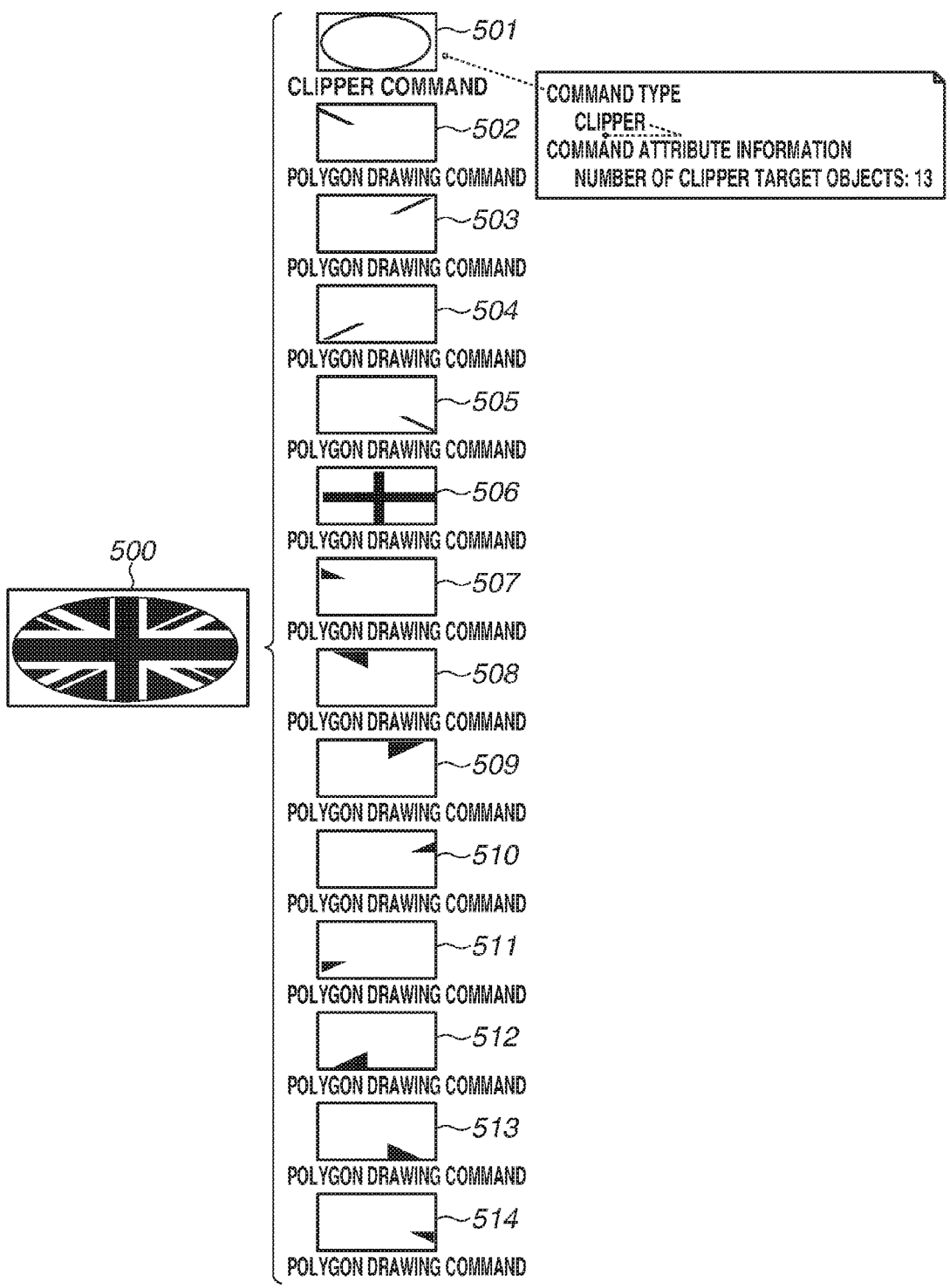
FIG. 5 is a diagram illustrating a basic clip process by page description language (PDL) commands.

With reference to FIG. 5, an overview of the clip process is described. In FIG. 5, an image 500 includes objects 501 to 514 based on 14 PDL commands in the PDL data. The object 501 is a clipper object corresponding to a clipper command for specifying the clip process. That is, the clipper object 501 is an object used for, for example, performing the clip process (a clipping process) on other polygon objects. For the clipper object 501, a clipper command is specified as a command type. Each of the objects 502 to 514 is a polygon object. For each of the objects 502 to 514, a polygon rendering command is specified as a command type. Each of these 13 objects 502 to 514 is a target of the clip process and is referred to as a "clipped object".

Further, the clipper command has, as attribute information of the command, the number of clipped objects as targets of the clip process by the clipper command. The number of clipped objects in the attribute information indicates the range of the clip process (hereinafter referred to as a "clip range"). That is, as many objects following the clipper object as the number of clipped objects in the attribute information are targets of the clip process by the clipper command. In the case of the example of FIG. 5, the clipper command corresponding to the clipper object 501 indicates that the number of clipped objects is 13 (the clip range is 13 levels). Thus, 13 clipped objects are targets of the clip process.

In the case of the example of FIG. 5, the clipper object 501 corresponding to the clipper command is an object for clipping the clipped objects into an ellipse. Thus, the clipped objects 502 to 514 in the clip range specified by the clipper command are clipped into an ellipse by the clipper object 501.

Then, in the example of FIG. 5, the clipped objects 502 to 514 clipped into an ellipse by the clipper object 501 are combined together, whereby the image 500 is rendered. That is, the clipped objects 502 to 514 are related to each other via the clipper object 501.

Figure 6:
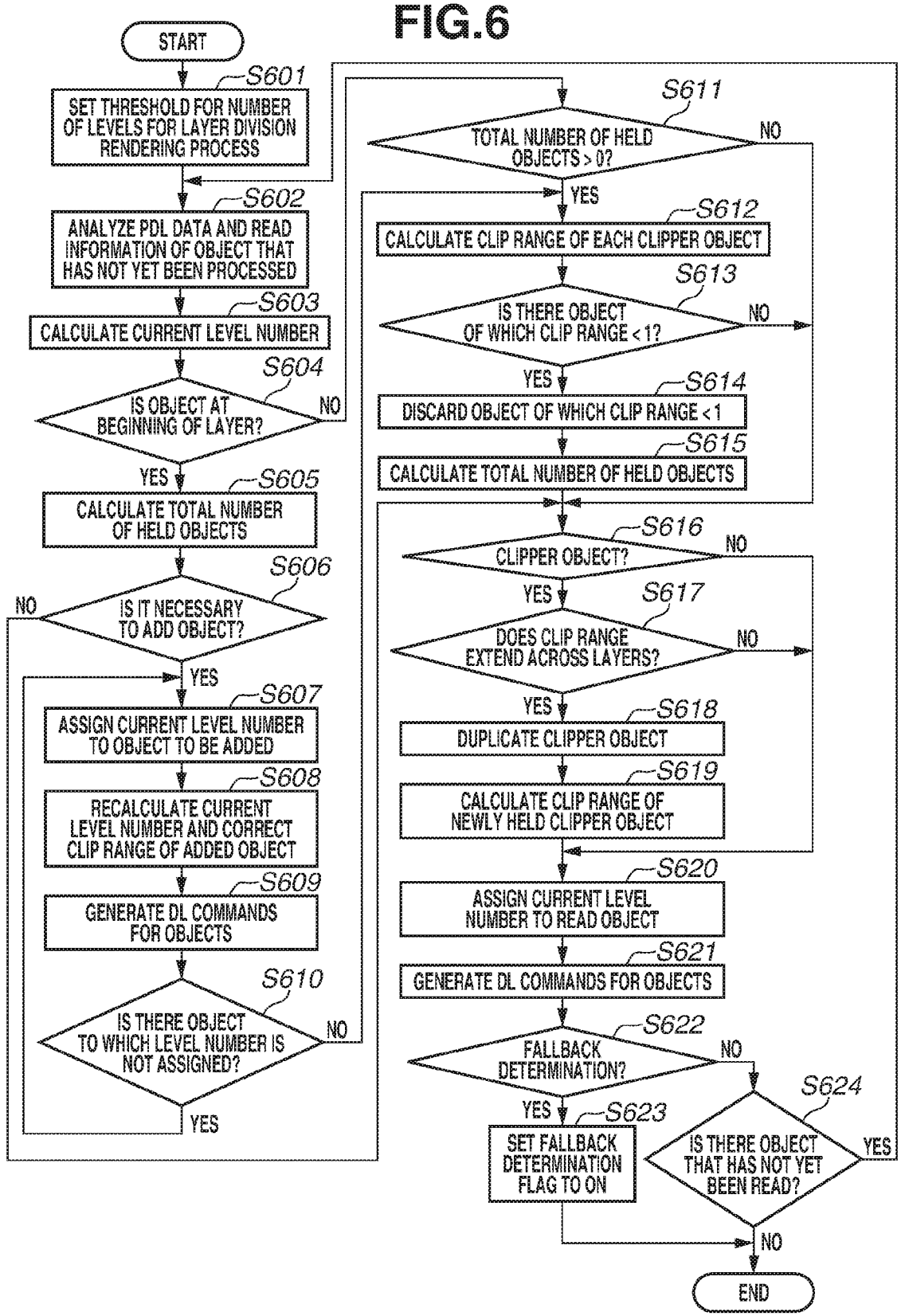
FIG. 6 is a flowchart of a display list generation process in a first exemplary embodiment.

Next, with reference to a flowchart in FIG. 6, a description is given of the display list generation process performed by the display list generation processing unit 410 in FIG. 4. The display list generation process illustrated in the flowchart in FIG. 6 is achieved by the CPU 205 loading a system software program, for the display list generation process, stored in the HDD 208 into the RAM 206 and executing the system software program.

First, in step S601, the CPU 205 sets a threshold for the number of levels for grouping for layer division in the layer division rendering process (hereinafter referred to as a "number-of-division-levels threshold"). That is, objects are classified into different layers with respect to each number of the threshold set in this process. After step S601, the processing proceeds to step S602. In the module illustrated in FIG. 4, the display list generation processing unit 410 sets the number-of-division-levels threshold in step S601.

In step S602, the CPU 205 analyzes PDL data that is being processed, and reads information, included in the PDL data, of an object that has not yet been processed. After step S602, the processing proceeds to step S603. In the module illustrated in FIG. 4, the object reading processing unit 411 of the display list generation processing unit 410 performs the process of analyzing PDL data and reading information of an object that has not yet been processed in step S602.

In step S603, in order that a level number is assigned to the object read in step S602, the CPU 205 calculates the current level number. Level numbers start with "1" are assigned to objects, respectively, by unique consecutive numbers. After step S603, the processing proceeds to step S604. In the modules in FIG. 4, the object classification processing unit 412 of the display list generation processing unit 410 performs the process of assigning a level number to the object in step S603.

In step S604, based on the current level number and the number-of-division-levels threshold in the layer division rendering process, the CPU 205 determines whether the object read in step S602 is an object at the beginning of a layer (i.e., an object at the start level of a layer). In a case where the CPU 205 determines that the read object is not an object at the beginning of a layer, the processing proceeds to step S611. In a case where, on the other hand, the CPU 205 determines that the read object is an object at the beginning of a layer, the processing proceeds to step S605. In the modules in FIG. 4, the object classification processing unit 412 performs the process of determining the position of the object in a layer in step S604.

In step S605, the CPU 205 determines whether there is a clipper object to be taken into account when the current object at the beginning of each layer is processed. That is, the CPU 205 calculates the total number of clipper objects held in the DL memory in step S618 (described below) in the processing up to the current object. After step S605, the processing proceeds to step S606. In the modules in FIG. 4, the object group determination processing unit 415 performs the process of step S605.

In step S606, based on the presence or absence of a clipper object held in the DL memory, the CPU 205 determines whether it is necessary to add a clipper object. That is, in a case where the total number of clipper objects calculated in step S605 is equal to or greater than 1, the CPU 205 determines that it is necessary to add a clipper object to the beginning of the current layer. In other words, the CPU 205 determines whether a clipper object included in the PDL data and a clipped object corresponding to the clipper object are classified into different groups (layers) by layer division. Then, in a case where the CPU 205 determines that the clipper object and the clipped object are classified into different groups, the CPU 205 determines that it is necessary to add, to the group in which the clipper object is not present, a clipper object. In a case where the CPU 205 determines that it is necessary to add a clipper object, the processing proceeds to step S607. In a case where, on the other hand, the CPU 205 determines that it is not necessary to add a clipper object, the processing proceeds to step S616. In the modules in FIG. 4, the object group determination processing unit 415 performs the process of determining whether it is necessary to add a clipper object in step S605.

In a case where the processing proceeds to step S616, the CPU 205 determines whether the object read in step S602 is a clipper object. In a case where the CPU 205 determines that the read object is not a clipper object, the processing proceeds to step S620. In a case where, on the other hand, the CPU 205 determines that the read object is a clipper object, the processing proceeds to step S617. In the modules in FIG. 4, the object type determination processing unit 413 performs the determination process in step S616.

In step S617, the CPU 205 determines whether the sum of the current level number calculated in step S603 and the clip range included in attribute information of the read clipper object exceeds the number of division levels (extends across the layers) set in step S601. That is, in this process, the CPU 205 determines whether the clipper object and one or more clipped objects corresponding to the clipper object are classified into different groups (layers). In a case where the CPU 205 determines that the clipper object and at least one of the clipped objects corresponding to the clipper object are not classified into different groups (layers), the processing proceeds to step S620. In a case where, on the other hand, the CPU 205 determines that the clipper object and at least one of the clipped objects corresponding to the clipper object are classified into different groups (layers), the processing proceeds to step S618.

In step S618, the CPU 205 duplicates the read clipper object and holds information of the read clipper object and information of the duplicated clipper object in the DL memory. After step S618, the processing proceeds to step S619.

In step S619, the CPU 205 corrects the clip range of the duplicated clipper object. More specifically, the CPU 205 sets, as the clip range included in the attribute information of the read clipper object, the difference between the number of division levels set in step S601 and the remainder of dividing the current level number calculated in step S603 by the number of division levels. The CPU 205 sets, as a new clip range, the difference between the clip range included in the attribute information of the duplicated clipper object and the corrected clip range of the read clipper object. Consequently, the duplicated clipper object has attribute information that can be inserted into the beginning of a different group (layer). After step S619, the processing proceeds to step S620.

In step S620, the CPU 205 assigns the current level number obtained in step S603 to the read object. After step S620, the processing proceeds to step S621.

In step S621, the CPU 205 generates DL commands for objects and stores the DL commands in the DL memory. After step S621, the processing proceeds to step S622.

In step S622, the CPU 205 determines whether the capacity of the DL commands stored in the area of the DL memory exceeds a predetermined threshold. That is, in this process, the CPU 205 determines whether the capacity of the DL commands to be stored in the DL memory exceeds a predetermined threshold corresponding to capacity requiring the fallback process (hereinafter referred to as a "fallback threshold"). In a case where the CPU 205 determines that the capacity of the DL commands to be stored in the DL memory exceeds the fallback threshold, the processing proceeds to step S623. In a case where, on the other hand, the CPU 205 determines that the capacity of the DL commands to be stored in the DL memory does not exceed the fallback threshold, the processing proceeds to step S624.

In step S623, the CPU 205 sets the fallback determination flag to on, and the display list generation process in FIG. 6 ends.

In step S624, the CPU 205 determines whether the reading of all the objects in the PDL data and the process of generating DL commands are completed. In a case where the CPU 205 determines that the reading of all the objects in the PDL data and the process of generating DL commands are completed, the display list generation process in FIG. 6 ends. In a case where, on the other hand, the CPU 205 determines that the reading of all the objects in the PDL data and the process of generating DL commands are not completed, the processing returns to step S602.

Suppose that after the processing proceeds to step S602, the processing of the CPU 205 proceeds to step S603 and then to step S604, the CPU 205 determines in step S604 that an object is located at the beginning of a layer, and the processing further proceeds to step S605 and then to step S606. Then, suppose that the CPU 205 determines in step S606 that a clipper object and a clipped object having a dependent relationship with each other are classified into different groups, and therefore, the CPU 205 determines that it is necessary to add a clipper object. As described above, in a case where the CPU 205 determines in step S606 that it is necessary to add a clipper object, the processing proceeds to step S607.

In step S607, the CPU 205 assigns the current level number obtained in step S603 to the clipper object to be added. After step S607, the processing proceeds to step S608. In the modules in FIG. 4, the group adjustment processing unit 414 performs the process of step S607 as a part of the clip command addition process.

In step S608, the CPU 205 recalculates the current level number and the clip range. That is, in this case, groups are reclassified, and therefore, level numbers are assigned again to objects in the reclassified groups. Thus, in step S608, in a case where a level number is assigned to the clipper object to be added, the CPU 205 sequentially assigns level numbers again to clipped objects in the same group. In this process, the clip range of the clipper object to be added is a clip range assuming that the clipper object is to be added to the beginning of a layer. Further, it is not assumed that another clipper object is to be added after the clipper object to be added. Thus, every time a clipper object is added (the flow of steps S606 to S610 is repeatedly executed as many times as the number of clipper objects to be added), the clip ranges of the already added clipper objects are increased by 1. After step S608, the processing proceeds to step S609. In the modules in FIG. 4, the group adjustment processing unit 414 performs the process of recalculating level numbers and reassigning the level numbers to objects in step S608 as a part of the clip command addition process.

In step S609, the CPU 205 generates DL commands for the objects for which level numbers are recalculated and to which the level numbers are assigned in step S608. After step S609, the processing proceeds to step S610. In the modules in FIG. 4, the group adjustment processing unit 414 performs the DL command generation process in step S609 as a part of the clip command addition process.

In step S610, the CPU 205 determines whether among the objects in the reclassified group, there is an object to which a level number is not assigned and for which a DL command is not generated. In the modules in FIG. 4, the group adjustment processing unit 414 performs the determination process in step S610 as a part of the clip command addition process.

Then, the CPU 205 repeats the processes of steps S607 to S610 until a level number is reassigned to, and a DL command is generated for, each of the objects in the group. Consequently, if a clipper object and a clipped object having a dependent relationship are divided into different groups, the process of adding a clipper command, the process of reassigning level numbers, and the process of generating DL commands are performed for each group. In a case where the CPU 205 determines in step S610 that the assignment of level numbers to all the objects is completed, the processing proceeds to step S612.

In a case where a clipper object is added to the beginning of a layer in steps S607 to S610, then in step S622, the CPU 205 makes a fallback determination based on the capacity of the DL memory including the DL commands generated in step S609 and S621.

Further, in a case where the CPU 205 determines in step S604 that the object is not at the beginning of a layer, and the processing proceeds to step S611, then in step S611, the CPU 205 determines whether there is a clipper object held in the DL memory in the process of step S618. More specifically, the CPU 205 determines whether the total number of objects obtained in step S619 is greater than "0". In a case where the CPU 205 determines that the total number of objects is greater than "0", and there is a clipper object held in the DL memory, the processing proceeds to step S612. In a case where, on the other hand, the CPU 205 determines that there is no clipper object held in the DL memory, the processing proceeds to step S616. In the modules in FIG. 4, the group adjustment processing unit 414 performs the determination process in step S611 as a part of the clip command correction process.

In step S612, regarding each clipper object held in the process of step S618, the CPU 205 calculates the number of remaining clipped objects (the clip range) other than the read object. More specifically, the object read in step S602 becomes a clipped object for each held clipper object. Thus, the CPU 205 subtracts "1" from the clip range of each held clipper object. After step S612, the processing proceeds to step S613. In the display list generation processing unit 410 in FIG. 4, the group adjustment processing unit 414 performs the process of step S612 as a part of the clip command correction process.

In step S613, the CPU 205 determines whether the clip range calculated in step S612 for each held clipper objects is smaller than "1". In other words, in step S612, the CPU 205 determines whether the clip range is "0". That is, in a case where the clip range of a clipper object is smaller than "1", the subsequent objects are not to be subjected to the clip process. In a case where the CPU 205 determines that the clip range is smaller than "1", the processing proceeds to step S614. In a case where, on the other hand, the CPU 205 determines that the clip range is not smaller than "1", the processing proceeds to step S616. In the modules in FIG. 4, the object group determination processing unit 415 performs the process of step S613.

In a case where the CPU 205 determines in step S613 that the clip range is smaller than "1", this means that the reading of all the clipped objects corresponding to the clipper object is completed. That is, the clip process using this clipper object is not to be performed on the subsequent objects. Thus, in step S614, the CPU 205 discards the clipper object of which the clip range is smaller than "1" according to the determination. In the modules in FIG. 4, the group adjustment processing unit 414 performs the process of step S614 as a part of the clip command correction process.

In step S615, the CPU 205 calculates the total number of remaining clipper objects other than the clipper object discarded in step S614. In the modules in FIG. 4, the group adjustment processing unit 414 performs the process of step S615 as a part of the clip command correction process.

That is, the processes of steps S612 to S615 are the process of correcting a clip command for each group so that the clipped objects present in the clip range are subjected to the clip process. After step S615, the processing proceeds to step S616. This is the display list generation process performed by the display list generation processing unit 410 in FIG. 4.

Figure 7:
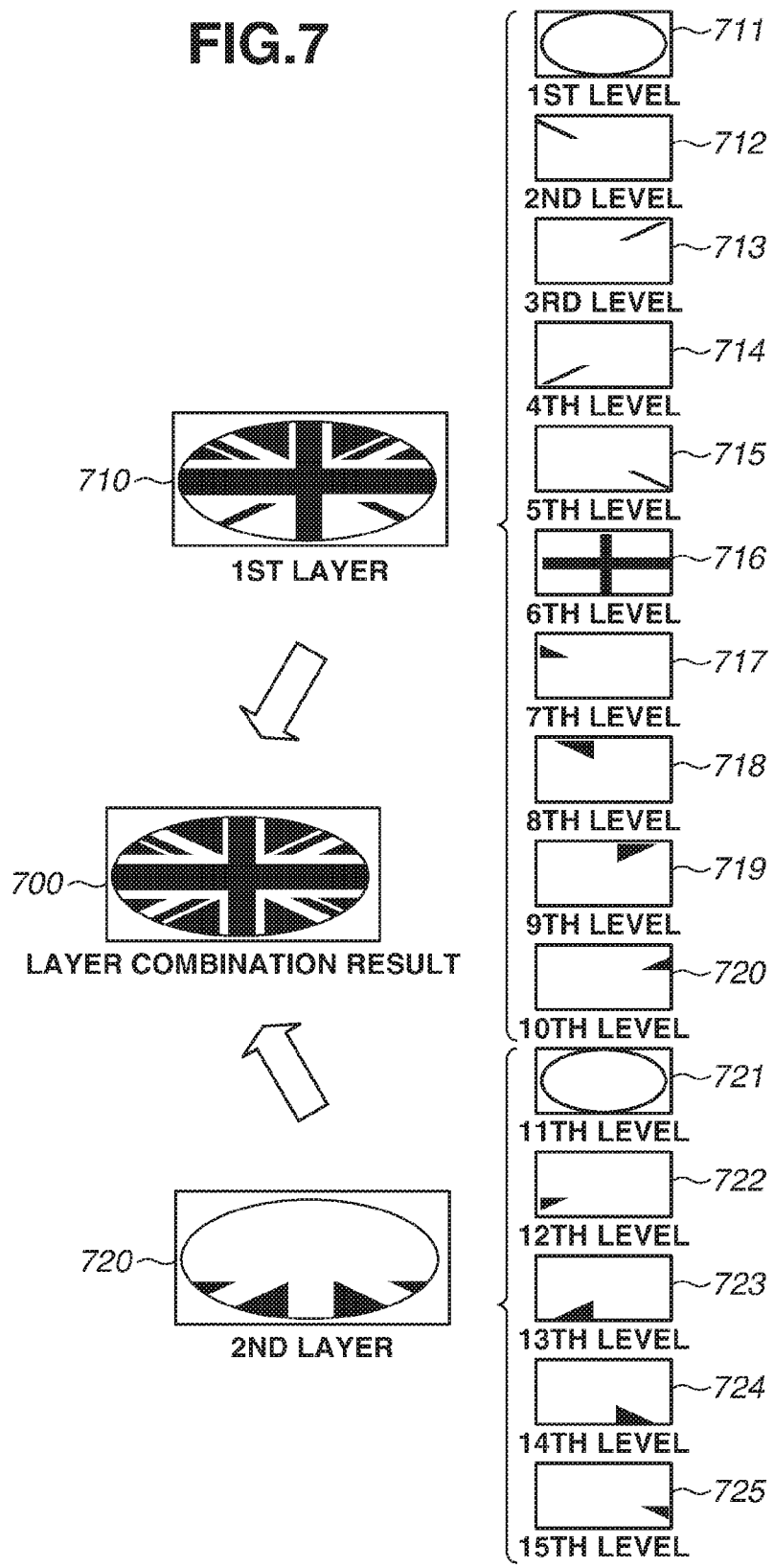
FIG. 7 is a diagram illustrating an example of clip process results divided into groups.

Next, with reference to FIG. 7, a description is given of objects and the levels of the objects in layers in a case where the layer division rendering process is performed based on a display list generated in the process of the flowchart in FIG. 6. FIG. 7 illustrates an example of a case where the threshold for the number of levels for classifying objects into groups and performing layer division (the number-of-division-levels threshold) is set to 10 levels. In this case, a display list is obtained such that a group is formed for every 10 levels and layer division is performed. The example in FIG. 7 illustrates a display list of a case where, although 14 objects are supposed to be included in a single group as in FIG. 5, a group is formed for every 10 levels to divide layers by the layer division rendering process.

In the case of the example of FIG. 7, at a first level in the display list, a DL command indicating a clipper object (a clipper command) is generated. In the clipper command for the first level, the number-of-division-levels threshold for dividing groups is specified as 10 levels, and therefore, the clip range includes up to a tenth level. In the case of the example of FIG. 7, the first level is a clipper object 711, and therefore, the clip range is the remaining nine levels from second to tenth levels. Thus, clipped objects as targets of the clip process using the clipper object 711 are objects 712 to 720. Consequently, in the case of the example of FIG. 7, from the clipper object 711 at the first level and the clipped objects 712 to 720 at the second to tenth levels, an image 710 is rendered as an image of a first layer.

Further, in the example of FIG. 7, to an eleventh level in the display list, a clipper object and a DL command (a clipper command) are added. In the clipper command for the eleventh level, the number of levels for dividing groups is specified as five levels, and therefore, the clip range includes up to a fifteenth level. In this case, a clipper object 721 and the clipper command are added to the eleventh level, and therefore, the clip range is the remaining four levels from twelfth to fifteenth levels. Thus, in this case, clipped objects as targets of the clip process using the clipper object 721 are objects 722 to 725. Consequently, in the case of the example of FIG. 7, from the clipper object 721 at the eleventh level and the clipped objects 722 to 725 at the twelfth to fifteenth levels, an image 720 is rendered as an image of a second layer.

Then, from the display list in this case, the image 710 of the first layer and the image 720 of the second layer are combined together, whereby an image 700 is rendered.

<Flow of Layer Division Rendering Process>

Figure 8:
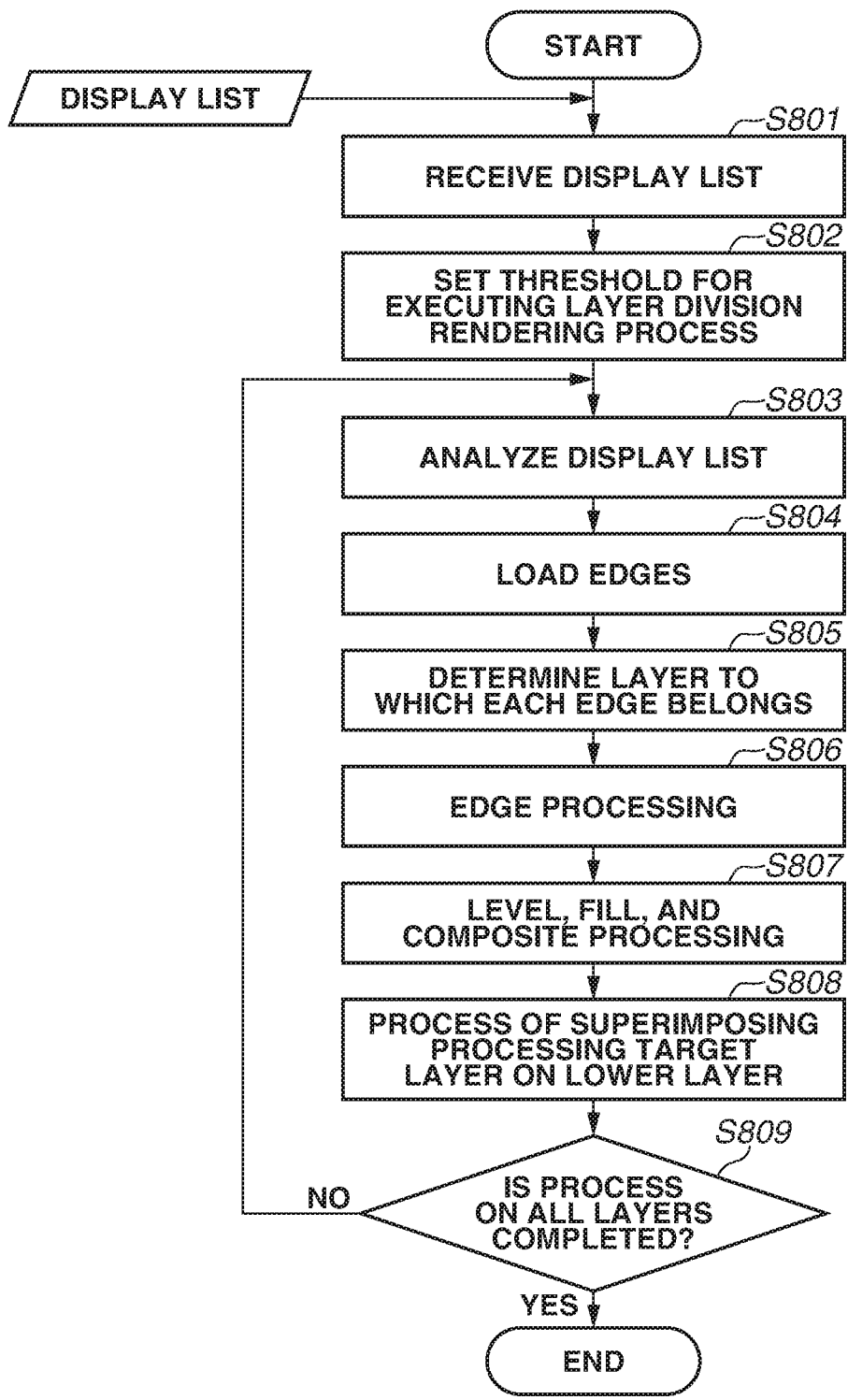
FIG. 8 is a flowchart of a division rendering process.

Next, with reference to a flowchart illustrated in FIG. 8, the layer division rendering process in step S304 and S306 in FIG. 3 is described. A processing flow in FIG. 8 is executed by the control unit 101. More specifically, the processing flow is achieved by the CPU 205 of the control unit 101 loading a system software program, for the division rendering processing unit 420, stored in the HDD 208 into the RAM 206 and executing the system software program.

In the flowchart in FIG. 8, in step S801, the CPU 205 receives a display list for a single page on which the rendering process is performed, and stores the display list in the main memory. After step S801, the processing proceeds to step S802.

In step S802, as in the description of the display list generation processing unit 410 in FIG. 4, the CPU 205 sets the number-of-division-levels threshold for layer division according to the classification of groups in the layer division rendering process. After step S802, the processing proceeds to step S803.

In step S803, the CPU 205 interprets the display list. After step S803, the processing proceeds to step S804.

In step S804, the CPU 205 loads edge data into the main memory. After step S804, the processing proceeds to step S805. In the modules in FIG. 4, the edge processing unit 421 of the division rendering processing unit 420 performs the edge loading process in step S804.

In step S805, the CPU 205 determines, in the edge data included in the display list, edge data belonging to a processing target layer. Then, in a case where the CPU 205 determines that the loaded edge data does not belong to the processing target layer, the CPU 205 skips the edge data. After step S805, the processing proceeds to step S806. In the modules in FIG. 4, the edge processing unit 421 performs the determination process in step S805.

In step S806, the CPU 205 performs edge processing. That is, the CPU 205 performs a scan rendering process on edge data, from among the edge data included in the display list in the DL memory, corresponding to an amount that will not cause a cache miss in the edge sorting process by the edge processing unit 421 in FIG. 4. After step S806, the processing proceeds to step S807.

In step S807, the CPU 205 performs the processes of the level processing unit 422, the fill processing unit 423, and the composite processing unit 424 of the division rendering processing unit 420 in FIG. 4 by a pipeline process, thereby generating a bitmap page image of the processing target layer. After step S807, the processing proceeds to step S808.

In step S808, the CPU 205 performs the process of superimposing the bitmap page image of the processing target layer generated in steps S805 to S810 on a bitmap page image of an already rendered background layer (lower layer). After step S808, the processing proceeds to step S809.

In step S809, the CPU 205 determines whether the rendering process on all the layers included in the processing target display list is completed. Then, in a case where the CPU 205 determines that the rendering process on all the layers is completed, the processing of the flowchart in FIG. 8 ends. In a case where, on the other hand, the CPU 205 determines that the rendering process on all the layers is not completed, the CPU 205 sets the next higher layer as a processing target layer, and the processing returns to step S803. This is the description of the layer division rendering process.

Based on the image processing apparatus according to the present exemplary embodiment, as described above with reference to FIG. 7, the clipper object 721 is added to the eleventh level on the second layer, thereby enabling the clip process on the objects 722 to 725 at the twelfth level and after that. Thus, in the process of superimposing the first and second layers, it is possible to perform the clip process on the clipped objects 722 to 725, which belong to the second layer.

As described above, in the image processing apparatus according to the present exemplary embodiment, the layer division rendering process is performed so that a display list that enables the clip process on clipped objects which are classified into different groups and extend across layers is generated. That is, in a case where a plurality of objects have a dependent relationship as in the clip process, and for example, even in a case where groups to which the objects belong are divided before and/or after the fallback process, it is possible to complete processing in each group, and it is possible to obtain a proper rendering result.

Next, an image processing apparatus according to a second exemplary embodiment is described. The image processing apparatus according to the second exemplary embodiment is similar to that according to the first exemplary embodiment except for the display list generation process in step S302 in the processing flow in FIG. 3.

In the second exemplary embodiment, in the layer division rendering process, objects (raster operation (ROP) objects) to be subjected to a raster operation process (an ROP process) are treated. The ROP process is an example of the process of rendering performed with use of a logical operation in the order of raster. That is, the objects to be subjected to the ROP process are subjected to a logical operation in the order of raster, and therefore can be said to be objects having a dependent relationship with each other.

In the case of the second exemplary embodiment, the object group determination processing unit 415 in FIG. 4 can determine whether objects required for the raster operation process (the ROP process) are classified into different groups. That is, in a case where the types of objects determined by the object type determination processing unit 413 are ROP objects, the object group determination processing unit 415 determines whether the ROP objects are classified into different groups. Then, in a case where the object group determination processing unit 415 determines that the ROP objects are classified into different groups, the object group determination processing unit 415 notifies the group adjustment processing unit 414 of the determination result.

In a case where the object group determination processing unit 415 determines that the ROP objects are classified into different groups, the group adjustment processing unit 414 performs a padding addition process for adding a padding object that does not affect the results of logical operations, so that the ROP objects are classified into a single group. In the case of the present exemplary embodiment, a padding object is an object that does not affect the results of a logical operation in the rendering process, that is, that does not affect rendering (hereinafter referred to as a "padding level object"). In this case, the padding object is information for adjusting the positions of the ROP objects relative to the position of layer division.

Further, in a case where the object group determination processing unit 415 determines that objects to be subjected to the clip process are classified into different groups, the group adjustment processing unit 414 performs the process of adding a padding level object. In this case, the group adjustment processing unit 414 adds a padding level object to the groups to which the clip objects belong, so that the clip objects are classified into a single group.

Figure 9:
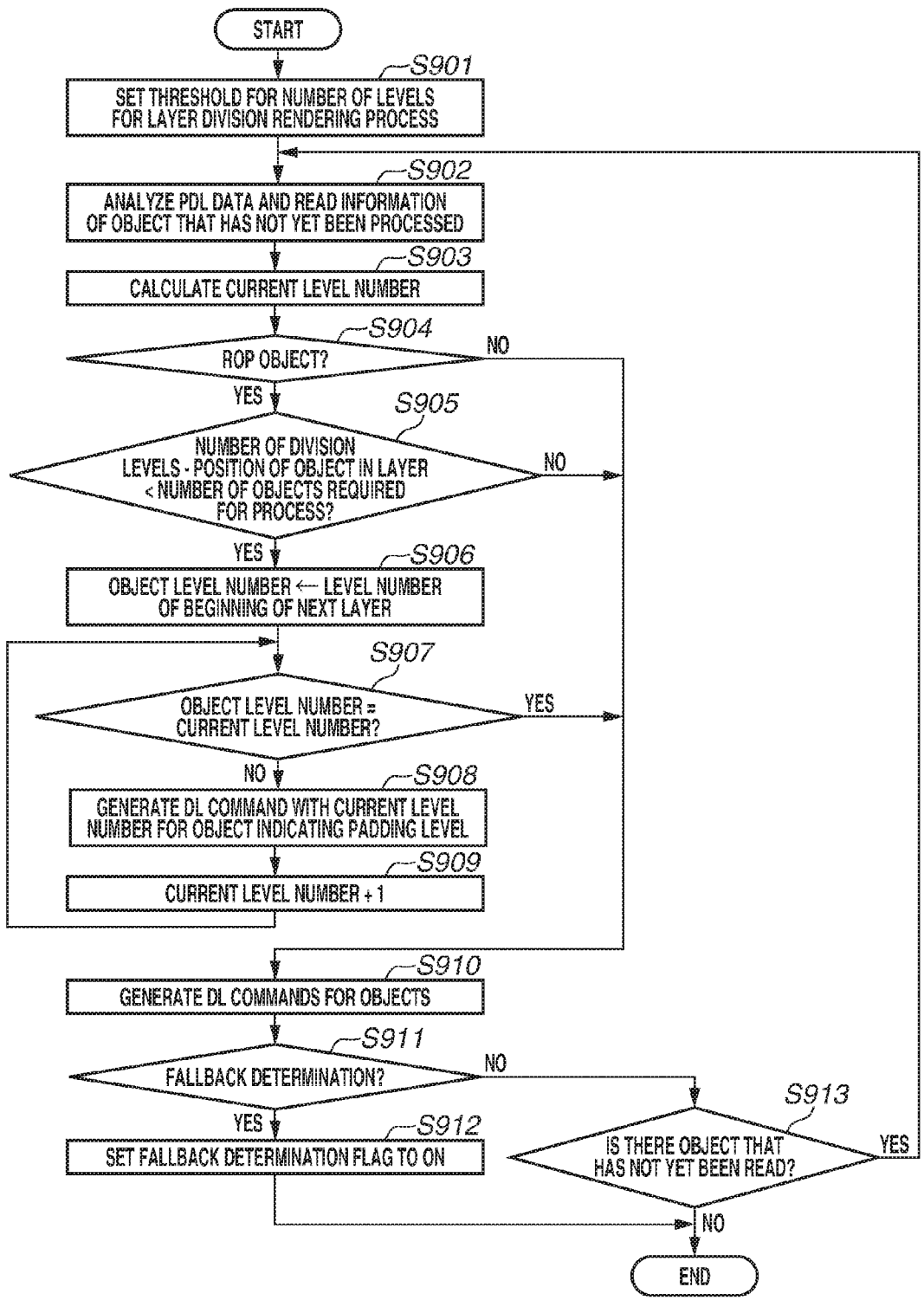
FIG. 9 is a flowchart of a display list generation process in a second exemplary embodiment.

With reference to FIG. 9, a description is given below of the display list generation process in step S302 executed by the control unit 101 in the second exemplary embodiment. A processing flow illustrated in FIG. 9 is executed by the control unit 101. More specifically, the processing flow is achieved by the CPU 205 of the control unit 101 loading a system software program, for the display list generation process, stored in the HDD 208 into the RAM 206 and executing the system software program.

In the flowchart in FIG. 9, the processes of steps S901, S902, and S903 are similar to the processes of steps S601, S602, and S603, respectively, in FIG. 6 and therefore are not described here. In the case of the flowchart in FIG. 9, after step S903, the processing proceeds to step S904.

In step S904, the CPU 205 determines whether the read object has attribute information of an ROP process level. In a case where the CPU 205 determines that the read object does not have attribute information of an ROP process level, the processing proceeds to step S910. In a case where, on the other hand, the CPU 205 determines that the read object has attribute information of an ROP process level, the processing proceeds to step S905. In the modules in FIG. 4, the object type determination processing unit 413 performs the determination process in step S904. The processes of steps S910 to S913 are similar to the processes of steps S621 to S624, respectively, in FIG. 6 and therefore are not described here.

In step S905, the CPU 205 determines whether an object having a dependent relationship with the read object based on the ROP process is located on the next layer. That is, the CPU 205 determines whether an object, from among objects supposed to be subjected to the ROP process as the same layer is located on the next layer by layer division. Then, in a case where the CPU 205 determines that an object having a dependent relationship with the read object based on the ROP process is not located on the next layer, the processing proceeds to step S910. In a case where, on the other hand, the CPU 205 determines that an object having a dependent relationship with the read object based on the ROP process is located on the next layer, the processing proceeds to step S906. In the modules in FIG. 4, the object group determination processing unit 415 performs the determination process in step S905.

In step S906, the CPU 205 corrects the level number of the object for which the current level number is set, to the level number of the beginning of the next layer. After step S906, the processing proceeds to step S907. In the modules in FIG. 4, the group adjustment processing unit 414 performs the level number correction process in step S906.

In step S907, the CPU 205 determines whether the level number of the object is the current level number. In a case where the CPU 205 determines that the level number of the object is the current level number, the processing proceeds to step S910. In a case where, on the other hand, the CPU 205 determines that the level number of the object is not the current level number, the processing proceeds to step S908. In the modules in FIG. 4, the group adjustment processing unit 414 performs the process of step S907 as a part of the padding addition process.

In step S908, the CPU 205 generates for a padding level object a DL command to which the current level number is assigned. After step S908, the processing proceeds to step S909. In the modules in FIG. 4, the group adjustment processing unit 414 performs the process of step S908 as a part of the padding addition process.

In step S909, the CPU 205 increments the current level number, and the processing returns to step S907. In the modules in FIG. 4, the group adjustment processing unit 414 performs the process of step S909 as a part of the padding addition process.

In other words, in steps S907 to S909, the CPU 205 executes the process of adding a padding level object to the level at which, as a result of the correction of the level number of the object, an object to be subjected to a rendering process by the ROP process is not present.

In the display list generation process in the second exemplary embodiment, an object, from among ROP process objects having a dependent relationship with each other, determined as an object extending across different groups (layers) and the rest of the ROP process objects are classified into a single group. Thus, according to the present exemplary embodiment, it is possible to perform the layer division rendering process while outputting a proper rendering result in which processing is completed in a group (a layer).

Further, the process of adding a padding level object as in the second exemplary embodiment is also applicable to the clip process in the first exemplary embodiment. That is, in such a case, a padding level object is added to adjust the position of a clipper object in a group (a layer) so that a clipped object is subjected to the clip process. Further, in this case, for example, based on the position of an object in the layer, the CPU 205 calculates as a threshold (hereinafter referred to as a "padding addition threshold") of the number of padding level objects that need to be added. Then, in a case where the number of padding level objects that need to be added is equal to or greater than the padding addition threshold, and the majority of levels in the layer is padding information, the processing is switched to the above processing of the first exemplary embodiment. Consequently, in the display list generation process, in a case where the number of padding level objects that need to be added is less than or equal to the padding addition threshold, it is not necessary to hold object information.

According to each of the above exemplary embodiments, it is possible to perform processing completed in each of a plurality of classified groups (layers).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087726, filed Apr. 22, 2015, which is hereby incorporated by reference herein in its entirety.

What is claimed is:

1. An image processing apparatus for rendering objects, the image processing apparatus comprising:
a memory storing instructions;
one or more processors which execute the instructions and cause an image processing apparatus to function as:
a division unit configured to divide, according to order of closeness of the objects to a background surface, the objects so that each of the objects is included in any one of a plurality of groups including at least a first group and a second group, the objects included in the first group being closer to the background surface than the objects included in the second group; and
a rendering unit configured to render the objects included in the first group to obtain a rendering result, and render the objects included in the second group using the rendering result in a manner such that the objects in the second group is superimposed on the rendering result,
wherein, in a case where the division unit divides, in the dividing, a plurality of objects included in an application range of a clip command into the first group and the second group, the rendering unit applies, in the rendering of the first group, a clip process based on a first clip command corresponding to the clip command to a part of the plurality of objects divided into the first group, and applies, in the rendering of the second group, a clip process based on a second clip command corresponding to the clip command to a rest part of the plurality of objects divided into the second group,
a generation unit configured to generate the first clip command and the second clip command based on the clip command,
wherein the division unit divides the plurality of objects so that the part of the plurality of objects is included in the first group and the rest part of the plurality of objects is included in the second group,
wherein the generation unit generates the first clip command having an application range based on a number of the part of the plurality of objects, and the second clip command having an application range based on a number of the rest part of the plurality of objects, the application range of the first clip command including the part of the plurality of objects, the application range of the second clip command including the rest part of the plurality of objects, and
wherein the rendering unit applies, in the rendering of the first group, the clip process based on the first clip command to the part of the plurality of objects, and applies, in the rendering of the second group, the clip process based on the second clip command to the rest part of the plurality of objects,
wherein in a case where it is determined that the division unit divides the plurality of objects into the first group and the second group, the generation unit adds to the first group a padding object that does not affect rendering, so that the part of the plurality of objects included in the first group moves to the second group including the rest part of the plurality of objects.

2. The image processing apparatus according to claim 1, wherein the clip process is a process in which rendering a part of an object is performed and rendering a rest part of the object is not performed.

3. The image processing apparatus according to claim 1, wherein the clip process is a process of hiding a rest part of an object other than a part of the object.

4. The image processing apparatus according to claim 1, wherein, in a case where a number of padding objects to be added to the first group is equal to or greater than a threshold, the generation unit generates the first clip command and the second clip command.

5. The image processing apparatus according to claim 1, further comprising a printing unit configured to print an image using the rendering result, of the first group, and a rendering result, of the second group, obtained by the rendering unit.

6. An image processing method for rendering objects, the image processing method comprising:
dividing, according to order of closeness of the objects to a background surface, the objects so that each of the objects is included in any one of a plurality of groups including at least a first group and a second group, the objects included in the first group being closer to the background surface than the objects included in the second group; and rendering the objects included in the first group to obtain a rendering result, and rendering the objects included in the second group using the rendering result in a manner such that the objects included in the second group is superimposed on the rendering result, wherein, in a case where a plurality of objects included in an application range of a clip command are divided into the first group and the second group in the dividing, a clip process based on a first clip command corresponding to the clip command is applied to a part of the plurality of objects divided into the first group in the rendering of the first group, and a clip process based on a second clip command corresponding to the clip command is applied to a rest part of the plurality of objects divided into the second group in the rendering of the second group, generating the first clip command and the second clip command based on the clip command, wherein, in the dividing, the plurality of objects is divided so that the part of the plurality of objects is included in the first group, and the rest part of the plurality of objects is included in the second group, wherein, in the generating, the first clip command having an application range based on a number of the part of the plurality of objects and the second clip command having an application range based on a number of the rest part of the plurality of objects are generated, the application range of the first clip command including the part of the plurality of objects, the application range of the second clip command including the rest part of the plurality of objects, and wherein, in the rendering, the clip process based on the first clip command is applied to the part of the plurality of objects in the rendering of the first group, and the clip process based on the second clip command is applied to the rest part of the plurality of objects in the rendering of the second group, wherein in a case where it is determined that the plurality of objects are divided into the first group and the second group, a padding object that does not affect rendering is added to the first group, so that the part of the plurality of objects included in the first group moves to the second group including the rest part of the plurality of objects.

7. The image processing method according to claim 6, wherein the clip process is a process in which rendering a part of an object is performed and rendering a rest part of the object is not performed.

8. The image processing method according to claim 6, wherein the clip process is a process of hiding a rest part of an object other than a part of the object.

* * * * *